United States Patent [19]

Gillespie

[11] 4,214,437
[45] Jul. 29, 1980

[54] SPEED ADJUST

[76] Inventor: Richard R. Gillespie, P.O. Box 4675, Odessa, Tex. 79760

[21] Appl. No.: 895,135

[22] Filed: Apr. 10, 1978

[51] Int. Cl.³ .............................................. F02C 9/28
[52] U.S. Cl. ................................. 60/39.28 R; 137/51
[58] Field of Search ...................... 60/39.28 R, 39.28; 73/537, 540; 137/51, 53; 415/25, 43

[56] References Cited

U.S. PATENT DOCUMENTS

| | | | |
|---|---|---|---|
| 1,063,547 | 6/1963 | Kieser | 137/51 |
| 3,073,329 | 1/1963 | Kast | 137/51 |
| 3,091,925 | 6/1963 | May et al. | 60/39.28 R |
| 3,208,218 | 9/1965 | Schelin | 60/39.28 R |
| 3,216,434 | 11/1965 | Johnson | 137/51 |
| 3,332,232 | 7/1967 | Bevers | 60/39.28 R |

Primary Examiner—Louis J. Casaregola
Attorney, Agent, or Firm—Wendell Coffee

[57] ABSTRACT

A governor is adjusted as to speed by having a fluid diaphragm directly connected to a speeder spring which acts against a thrust bearing which bears against the flyweight toes. The fluid diaphragm is resisted by a set of low speed springs at all times. A lost motion arrangement brings a set of normal speed springs into use at larger diaphragm movement so that the response to the speed adjustment varies for different values of pressure acting upon the diaphragm.

2 Claims, 3 Drawing Figures

SPEED ADJUST

BACKGROUND OF THE INVENTION

(1) Field of the Invention

This invention relates to governors and more particularly to pneumatic speed regulators for variable speed engines.

(2) Description of the Prior Art

Adjustable flyweight governors for regulating the speed of large internal combustion engines or turbines are well known and have reached a high stage of development. A typical example of such would be a governor as manufactured for many years by Woodward Governor Company of Ft. Collins, Colorado. Basically, these governors rotate the flyweight from a drive shaft which is driven from the engine. (As used herein the term "engine" is meant to also include a variable speed turbine.) The position of a speeder plug against a speeder spring which bears against a thrust bearing on the toe of the flyweight will determine the speed of the engine. In operation, the thrust bearing will normally have a fixed position. Upward movement of the thrust bearing will indicate the speed of the engine is too fast and this upward movement will be translated to a valve which, through a hydraulic system, will decrease the fuel to the engine. A speed above the set speed will result in an opposite reaction.

The governors also have many additional adjustments and refinements not important here.

Therefore, the speed of the engine is actually controlled by the position of the speeder plug.

In many installations, satisfactory operation is obtained by manually setting the speeder plug for the desired speed.

However, in certain installations it is desired to automatically set the speed in the engine. E.g., in the operation of a compressor station, it is desirable to have the compressor and, thus, the engine operate at a speed responsive to the pressure of the incoming gas. I.e., the lower the gas pressure coming into this station, the slower the speed of the engine.

Before my invention, workers in the art would make the speed responsive to the external conditions (e.g., the pressure of the incoming gas at a pressure station) by attaching a pneumatic actuator externally of the governor by attaching the output of a pneumatic diaphragm to the arm on the speed adjustment shaft, which was linked to the speeder plug.

SUMMARY OF THE INVENTION

(1) New and Different Function

I have invented a more compact and responsive actuator for the governor. The diaphragm is directly connected to the speeder plug. By eliminating the speed adjust shaft with its seal problems and friction, the governor is made much more responsive to the incoming air signal which is used to regulate it. So the problems with friction and seals to keep dust and dirt out of the governor mechanism is eliminated. Furthermore, hysterisis and repeatability are greatly improved.

In addition to this, I have developed integrally with the diaphragm a two-spring system with a lost motion mechanism. By this arrangement, selective responses are made much better.

Thus, it may be seen that the function of the total arrangement far exceeds the sum of the functions of the individual elements of the springs, diaphragms, etc.

(2) Objects of this Invention

An object of this invention is to automatically adjust the governed speed of an engine.

Further objects are to achieve the above with a device that is sturdy, long lasting, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 1:
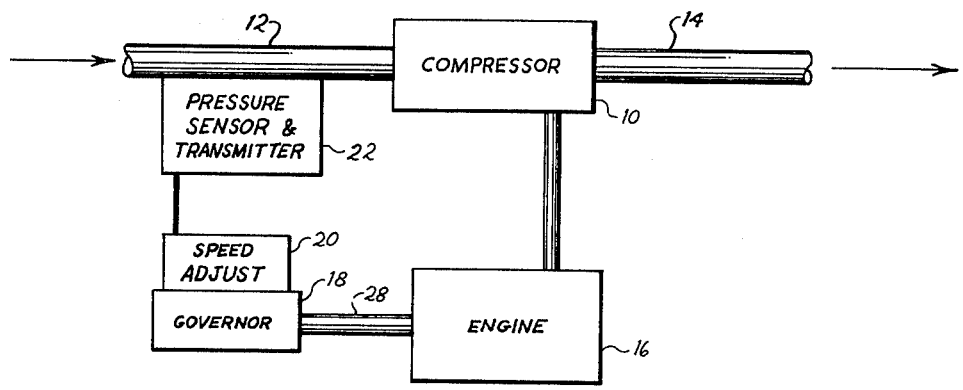
FIG. 1 is a schematical representation of the use of a governor having a novel speed adjust according to this invention in the environment of its use.

Referring to FIG. 1, there may be seen a typical installation as this invention would be used. Compressor 10 compresses gas from inlet pipe 12 to outlet pipe 14. The compressor 10 is driven from engine 16. The speed of the engine 16 is regulated by governor 18 according to the speed as set by the speed adjust mechanism 20. The speed adjust mechanism is responsive to the signal air pressure received from pressure sensor and transmitter 22.

In the typical installation as seen in FIG. 1, the lower the pressure in the inlet pipe 12, the slower it is desired to have the engine speed and therefore, the speed adjust would so regulate. I.e., the speed requirement of the load (compressor 10) is reflected by fluid pressure related thereto produced by sensor and transmitter 22 which is operatively associated with the load.

Figure 2:
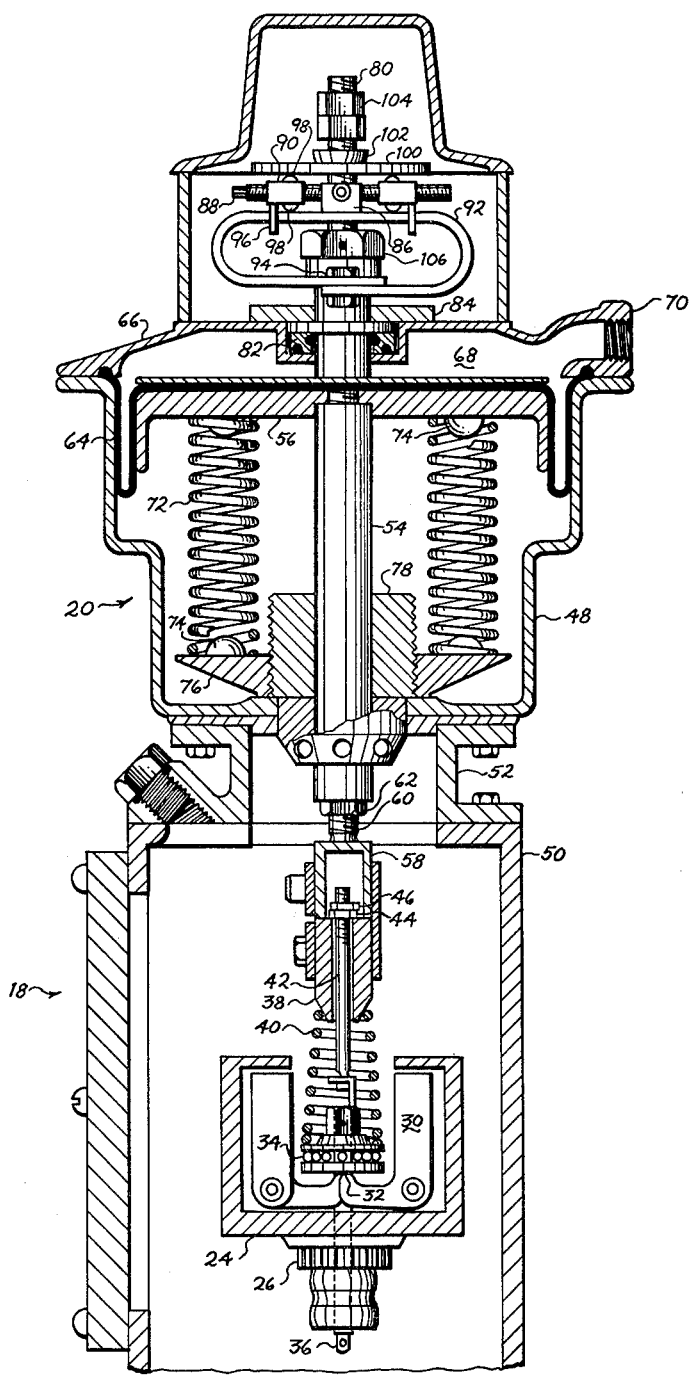
FIG. 2 is a sectional view of my invention attached to the ballhead assembly of the governor.

Referring to FIG. 2, there may be seen a portion of a governor 18. The ballhead 24 would be rotated through gear 26. The gear would be driven by a train of mechanism (not shown for clarity) from drive shaft 28 from the engine 16. The speed of rotation of the ballhead 24 will be directly proportional to the speed of the engine 16. Thus, the gear 26 is part of means for rotating the ballhead at a speed directly related to the engine speed. Flyweights 30 are pivoted to the ballhead 24. The toe 32 of each flyweight bears against thrust bearing 34. The speeder rod 36 is connected to the thrust bearing 34 and, therefore, any speed changes as determined by the mechanism are signalled to the engine through the speeder rod 36. The speeder rod 36 is a part of fuel feed means for regulating the fuel fed to the engine.

The speed of the engine is determined by the position of speeder plug 38. The lower the speeder plug 38 the more pressure will be exerted through speeder spring 40 onto the thrust bearing 34. With more pressure upon the thrust bearing the flyweights 30 must rotate faster to exert the counterbalancing centrifugal force. If the speeder plug 38 is raised above a predetermined position, the speeder plug will raise or lift up the thrust bearing 34 through shut down rod 42. This predetermined position is determined by the position of the shutdown nut 44, held in position by lock nut 46.

Those skilled in the governor arts will recognize that the detailed description to this point describes parts and elements which are old, well-known and commercially available upon the market.

Spring case or housing 48 is attached to the top of the governor housing 50 which contains the governor parts described above. Inasmuch as commercially available parts are used, an adapter 52 is used in making this transition or attachment.

Actuator rod 54 is securely attached and depends from diaphragm plate 56. The speeder coupler 58 is attached by suitable means to the top of speeder plug 38. Adjusting screw 60 is a part of the coupling and extends upward from the speeder coupler. The adjusting screw is threaded into the bottom of the actuator rod 54 and is held in adjusted position by lock nut 62.

Diaphragm 64 connects the diaphragm plate 56 to the spring housing 48. Diaphragm case 66 forms a chamber 68 between the diaphragm and diaphragm plate 56 at the diaphragm case 66. Nipple 70 forms a means for connecting control air pressure from the pressure sensor and transmitter into the chamber 68.

A plurality of helical compression low speed springs 72 extend between the bottom of diaphragm plate 56 and the top of spring seat 76. The exact positioning of spring seat 76 is adjusted by spring adjuster 78 which is a tube with external threads thereon. It may be seen that relative rotation of the spring seat 76 and ajuster 78 will determine the distance between the bottom of the diaphragm plate 56 and the top of the spring seat 76. A plurality of knobs 74 on the bottom of the plate 56 and the top of the seat 76 hold the helical compression springs 72 in position.

Stud 80 extends upward from the top of diaphragm plate 56 and as such forms an extension of the actuator rod 54. A seal is formed at the top of the diaphragm case 66 by bushing 82 with its associated O-rings. The bushing is held in place by bushing retainer 84 immediately above the diaphragm case 66.

Crosshead 86 is mounted for longitudinal vertical movement, relative to the stud 80 and upon the stud 80. Range adjusting screws 88 are attached for rotation into the crosshead. They are right and left hand screws. Lever elements 90 are mounted upon the adjusting screws 88.

Normal speed bow springs 92 are attached by nuts 94 to the bushing retainer 84. The levers 90 have alignment pins 96 depending from them which straddle the bow springs to hold the parts in position. Contact pins 98 upon the top and bottom of the levers transmit the force from the springs 92 to loading washer 100. Spherical washer 102 rides above loading washer 100 and it, like the crosshead, is mounted for vertical movement on the stud. Lock nuts 104 limit the travel of the spherical washer 102. The washers 100 and 102 are considered part of the crosshead assembly.

High speed adjustment nut 106 is threaded to the stud 80 and held in position by a suitable set screw. The bottom of the high speed adjustment nut will butt against the top of the bushing retainer 84 to limit the downward travel of the stud 80 and, thus, the actuator rod 54. As may be seen, this limits the downward travel of the speeder plug 38 and, therefore, limits the maximum speed of the engine 16.

Operation

To set the speed adjust mechanism for operation the following steps are followed. The spring adjust 78 is set to give a downward travel or position of the actuator rod 54 of 0.000 with a zero psi pneumatic signal. They are also set that the actuator rod 54 has a 0.115 inch (3 mm) travel at 3 psi (155 torr). In this setting the actuator is now set to follow the curve of point A to point B upon the graph seen in FIG. 3. The specific air pressures and speeder plug movements are not shown in the graph of FIG. 3 because it will be understood that those having ordinary skill in the art can adjust the movements and the pressures for any settings they desire. Also it will be understood that when it is stated that the actuator rod 54 will have a certain movement that the speeder plug 38 will have the same movement inasmuch as they are directly connected together. The operation from A to B is low speed operation and from B to C is normal speed operation.

With the 3 psi (155 torr) pneumatic signal, the actuator rod 54 is in the 0.115 inch (3 mm) travel position. The adjusting screw 60 is adjusted so there is enough speeder spring 40 deflection to balance the centrifugal force of the flyweights 30 which are being rotated by the ballhead 24. This adjustment of the adjustment screw 60 is made so that the engine will be operating at its desired minimum operating speed with the actuator rod 54 having the 0.115 inch (3 mm) position.

Also with the actuator rod 54 in the 0.115 (3 mm) travel position, the shutdown nut 44 and its lock nut 46 are adjusted on the shutdown rod 42 so that the bottom of the shutdown nut has 0.078 inch (2 mm) clearance between the top of the speeder plug 38 and the bottom of the nut. Thus, it may be seen when the pnuematic signal is dropped to 1 psi (50 torr) the parts in the actuator have moved upward and there is no longer any clearance in the top of the speeder plug 38 and the bottom of the shutdown nut 44. As the pneumatic signal to the activator is reduced, there is a positive lift on the speeder plug 38 which in turn lifts the shutdown rod 42 which in turn lifts the speeder rod 36. The lifting of the speeder rod 36 will in effect shutdown the engine 16.

Those having skill in the operation of engines using natural gas for fuel will understand certain problems, namely:

One, when starting the engine, as the engine starts turning over the governor will open to the maximum position. The governor will open the carburetor and mixing valves to the maximum position which may flood the engine before it starts or cause it to over speed or start-up since it is receiving maximum fuel.

Two, a natural gas engine is very unstable when unloaded. E.g., a twelve cylinder engine may be running unloaded and only three or four of its cylinders are at a normal operating temperature and, therefore, producing power. The governor will decrease fuel when a strong cylinder fires and increase fuel when a weak cylinder fires. This causes the governor to over correct giving a wild swing in engine speed.

Therefore, I provide the adjustment for the shutdown rod as set out above. In normal operation, the operator will send an artifical zero psi signal to the governor on start-up. The governor stays in the minimum position which holds the carburetor and mixing valves in the minimum fuel position to eliminate over fueling and flooding. With the zero psi signal air pressure the governor is not open and not controlling, so the engine is running on a fixed amount a fuel on a locked throttle. After the engine warms up the operator simply raises the pneumatic signal air pressure to the speed adjust mechanism 20 until the engine is running at the desired speed; he loads the engine, then changes a selector valve so that the manual pneumatic signal becomes an automatic signal which varies the speed of the engine in relation to the load, i.e., the pressure upon the inlet pipe 12.

Having described the operation of the engine and the speed adjust mechanism 20 in the operating range from point A to point B on the chart of FIG. 3 further settings of the speed adjust mechanism and the operation of the engine additionally will be described.

At a 3 psi (155 torr) pneumatic signal and a 0.115 inch (3 mm) actuator rod 54 travel position, the lock nuts 104 are set to contact the spherical washer 102. Therefore, any additional deflection of the actuator rod 54 will result not only in the compression of the helical compression spring 72 but also the deflection of the bow springs 92. I.e., there is a lost motion mechanism so that below minimum speeds only one set of springs, the compression low speed springs 72, are resisting the travel of the actuator rod 54. However, in the operating range of the governor, i.e., from the minimum speed to the maximum speed which is from point B to point C on the graph of FIG. 3 that the additional bow normal speed springs 92 also resist and are also biased against further deflections of the actuator rod 54. Basically, the slope of the line from point B to C which is to say the speed response of the engine 16 to different signal air pressures to nipple 70 of the speed adjust mechanism will be determined by the character of the combined springs of the helical compression spring 72 and the bow springs 92. However, inasmuch as the helical compression low speed spring 72 determines the slope of the curve from A to B then the character of the bow normal speed springs 92 are adjusted to determine the slope during the operating range from point B to point C. The character of the springs are primarily determined by using a different bow spring 92 and, therefore, a wide variety of bow springs having different spring constants are used. However, the deflection of the bow springs 92 may be further adjusted by adjusting the range adjusting screws 88. At the point when the maximum engine speed is reached and no higher engine speed is desired, further deflection of actuator rod 54 is limited by bringing the high speed adjustment nut into contact with the top of the bushing retainer 84. It is then locked securely in place by the set screw therein. This will prevent any further actuator rod 54 movement, i.e., any further movement of the speeder plug 38.

Normally, this high speed setting is adjusted at about 15 psi (775 torr) signal air pressure. However, those with ordinary skill in the art will understand that also there is a maximum speed at which the engine is to be operated and the adjustment nut 106 is set so that this maximum engine speed is not exceeded.

An analysis of my system will indicate that the speed adjust mechanism determines whether the governor is to make a low speed response or a normal speed response. I.e., whether the inlet air pressure is under 3 psi or over 3 psi. If the determination is made that the pressure is under 3 psi, only the low speed spring 72 will be in operation which is to say that for any change in fluid pressure at nipple 70 there will produce a large movement of actuator rod 54. By large movement of the actuator rod I mean there will be more movement of the actuator rod for a change in fluid pressure more than in the normal operating range.

Figure 3:
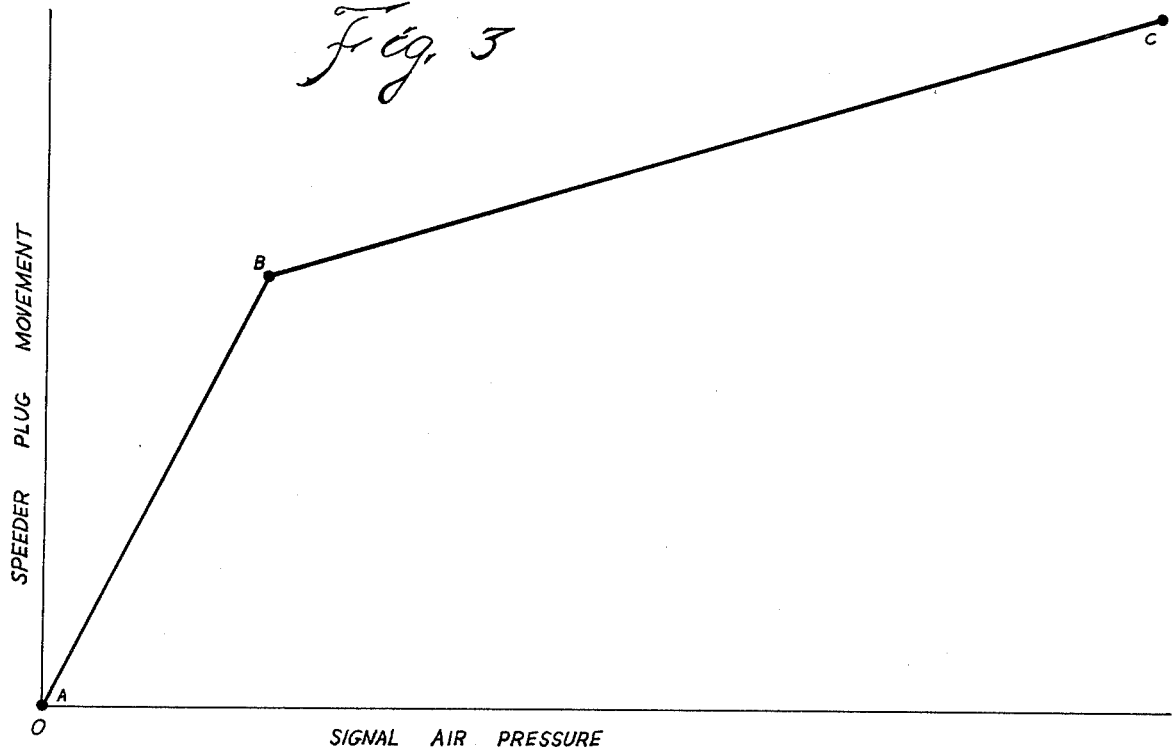
FIG. 3 is a chart showing the relationship between the speeder plug travel and the signal air pressure.

On the other hand, if a determination is made that the operation is in the normal speed range which is between points B and C on the graph of FIG. 3, then in that event the equipment will be in the normal speed range. Then in the normal speed range there will be a normal movement of the actuator rod 54 for a change in fluid pressure of the nipple 70 as seen in the graph between the points B and C.

Therefore, it may be seen that not only have I provided a speed adjust mechanism for the governor which is totally enclosed and free of external dust and dirt but also has the desirable feature of the different responses at low air pressure and for normal operating range.

The embodiment shown and described above is only exemplary. I do not claim to have invented all the parts, elements or steps described. Various modifications can be made in the construction, material, arrangement, and operations, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | compressor | 60 | adjusting screw |
|---|---|---|---|
| 12 | inlet pipe | 62 | lock nut |
| 14 | outlet pipe | 64 | diaphragm |
| 16 | engine | 66 | diaphragm case |
| 18 | governor | 68 | chamber |
| 20 | speed adjust mechanism | 70 | nipple |
| 22 | sensor/transmittor | 72 | helical compression springs |
| 24 | ballhead | 74 | knobs |
| 26 | gear | 76 | spring seat |
| 28 | drive shaft | 78 | spring adjuster |
| 30 | flyweights | 80 | stud |
| 32 | toe | 82 | bushing |
| 34 | thrust bearing | 84 | bushing retainer |
| 36 | speeder rod | 86 | crosshead |
| 38 | speeder plug | 88 | range adjusting screws |
| 40 | speeder spring | 90 | lever elements |
| 42 | rod, shutdown | 92 | bow springs |
| 44 | nut, shutdown | 94 | nuts |
| 46 | nut, lock | 96 | alignment pins |
| 48 | housing/spring case | 98 | contact pins |
| 50 | housing, governor | 100 | loading washer |
| 52 | adapter | 102 | spherical washer |
| 54 | actuator rod | 104 | lock nuts |
| 56 | diaphragm plate | 106 | high speed adjustment nut |
| 58 | speeder coupler | | |

SUBJECT MATTER CLAIMED FOR PROTECTION

I claim as my invention:
1. In a governor for an engine having
   a. a housing,
   b. fuel feed means in the housing for regulating the fuel fed to the engine,
   c. a ballhead in the housing with
      (i) flyweights pivoted thereto,

(ii) means for rotating the ballhead at a speed directly related to the engine speed,
  (iii) a thrust bearing contacting the flyweights, and
  (iv) a speeder rod attached to said thrust bearing,
  (v) said speeder rod forming a part of the fuel feed means,
d. a speeder spring biasing the thrust bearing against the flyweights, and
e. a speeder plug bearing against the speeder spring; the improved structure for positioning the speeder plug comprising:
f. a diaphragm attached to the housing,
g. a diaphragm plate attached to the diaphragm, and
h. a diaphragm case forming a fluid chamber on one side of the diaphragm plate,
j. an actuator rod securely attached to the diaphragm plate, on the side of the plate opposite the chamber,
k. the speeder plug securely attached to the actuator rod,
m. so that the speeder plug is directly connected to the diaphragm plate,
n. low speed compression springs bearing against the same side of the diaphragm plate as the actuator rod is attached to,
o. a stud attached to the diaphragm plate and extending through the diaphragm case,
p. a nut on the stud above the diaphragm case,
q. at least one normal speed spring attached to the top of the diaphragm case,
r. a crosshead assembly on top of the spring,
s. space between the top of the crosshead assembly and the nut when the diaphragm is in the position nearest the diaphragm case whereby only the low speed compression spring biases the diaphragm plate until the diaphragm plate moves downward and the nut contacts the crosshead assembly.

2. In a system having
a. an engine supplying power to
b. a load,
c. a sensor and transmitter operatively associated with the load for producing a fluid pressure related to the load speed requirements,
d. a governor for the engine, said governor including
e. a housing,
f. fuel feed means in the housing for regulating the fuel fed to the engine,
g. a ballhead in the housing with
  (i) flyweights pivoted thereto,
  (ii) means for rotating the ballhead at a speed directly related to the engine speed,
  (iii) a thrust bearing contacting the flyweights, and
  (iv) a speeder rod attached to said thrust bearing,
  (v) said speeder rod forming a part of the fuel feed means,
h. a speeder spring biasing the thrust bearing against the flyweights, and
j. a speeder plug bearing against the speeder spring; the improved structure for positioning the speeder plug comprising:
k. a diaphragm attached to the housing,
m. a diaphragm plate attached to the diaphragm,
n. an actuator rod securely attached to the diaphragm plate,
o. the speeder plug connected to the actuator rod so that movement of the actuator rod changes the position of the speeder plug,
p. said diaphragm plate having a first range of positions so that the actuator rod is in a low speed position,
q. said diaphragm plate having a second range of positions so that the actuator rod is in a normal speed position,
r. low speed compression springs bearing against the diaphragm plate at all times, and
s. normal speed springs biasing the diaphragm plate when the diaphragm plate moves to the normal speed position.

* * * * *